United States Patent [19]

Ejiri et al.

[11] 4,215,343

[45] Jul. 29, 1980

[54] DIGITAL PATTERN DISPLAY SYSTEM

[75] Inventors: Masakazu Ejiri; Hirotada Ueda, both of San Jose, Calif.

[73] Assignee: Hitachi, Ltd., Tokyo, Japan

[21] Appl. No.: 12,800

[22] Filed: Feb. 16, 1979

[51] Int. Cl.[2] .............................................. G06K 15/20

[52] U.S. Cl. ................................ 340/711; 84/DIG. 6; 84/1.01; 340/365 R; 340/724; 340/747; 340/799

[58] Field of Search ............... 340/711, 724, 727, 751, 340/747, 750; 84/DIG. 6

[56] References Cited

U.S. PATENT DOCUMENTS

| | | | |
|---|---|---|---|
| 3,345,458 | 10/1967 | Cole et al. | 340/750 |
| 3,768,092 | 10/1973 | Dodds et al. | 340/711 X |
| 3,786,482 | 1/1974 | Puckett et al. | 340/750 X |
| 3,988,728 | 10/1976 | Inoue et al. | 340/724 X |
| 4,089,524 | 5/1978 | Hauck | 340/724 X |
| 4,094,000 | 6/1978 | Brudevold | 340/711 X |
| 4,124,843 | 11/1978 | Bramson et al. | 340/711 |
| 4,129,859 | 12/1978 | Iwamura et al. | 340/711 |
| 4,142,180 | 2/1979 | Burson | 340/724 X |

*Primary Examiner*—David L. Trafton
*Attorney, Agent, or Firm*—Jackson, Jones & Price

[57] ABSTRACT

A pattern display system is disclosed which includes a keyboard for the manual entry of data representative of the patterns to be displayed, a microcomputer for accepting the entry data and for controlling the display system, a random access memory for storage of the entered data, audio circuitry controlled by the microcomputer for accepting data to provide audio signals representative of stored data, coding/decoding circuitry for the transfer of stored digital data to or from a tape recorder, and video circuitry utilized under the control of the microcomputer for the visual display on a cathode ray tube (CRT) of the patterns represented by the stored data. Specifically, the video circuitry includes read-only memories which are controlled to provide video pattern information in response to the stored data which represented desired patterns and timing information for the CRT.

15 Claims, 13 Drawing Figures

FIG. 3
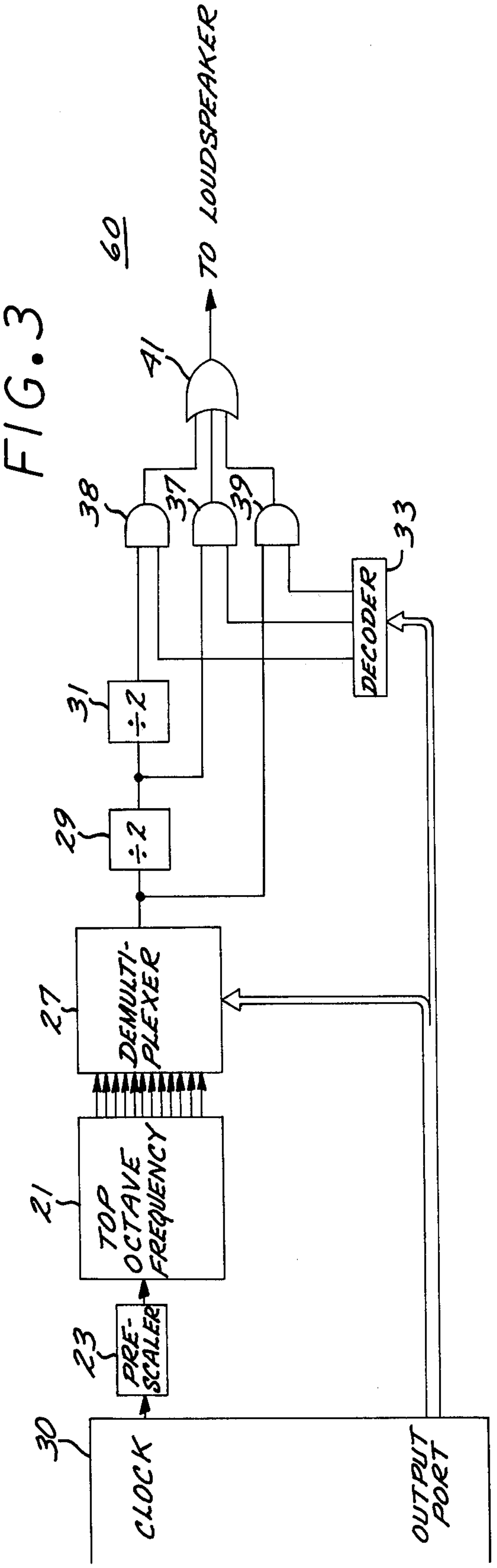
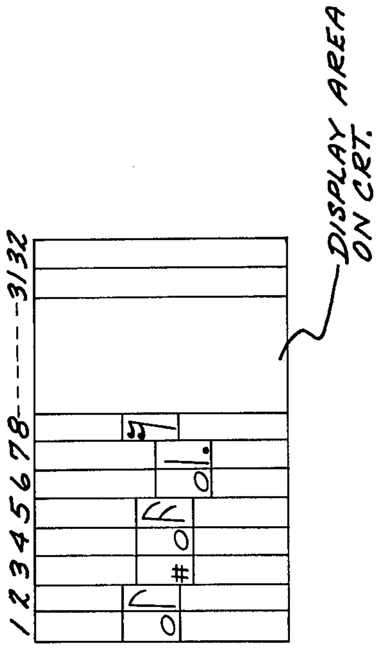
FIG. 4B
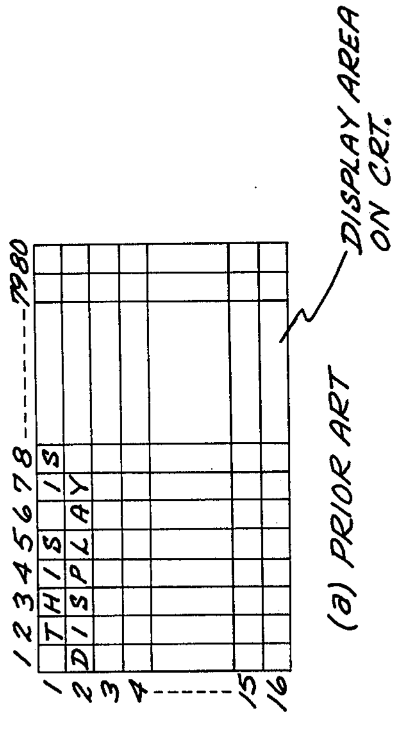
FIG. 4A

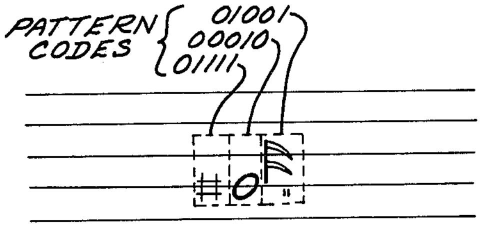
FIG. 6
FIG. 7
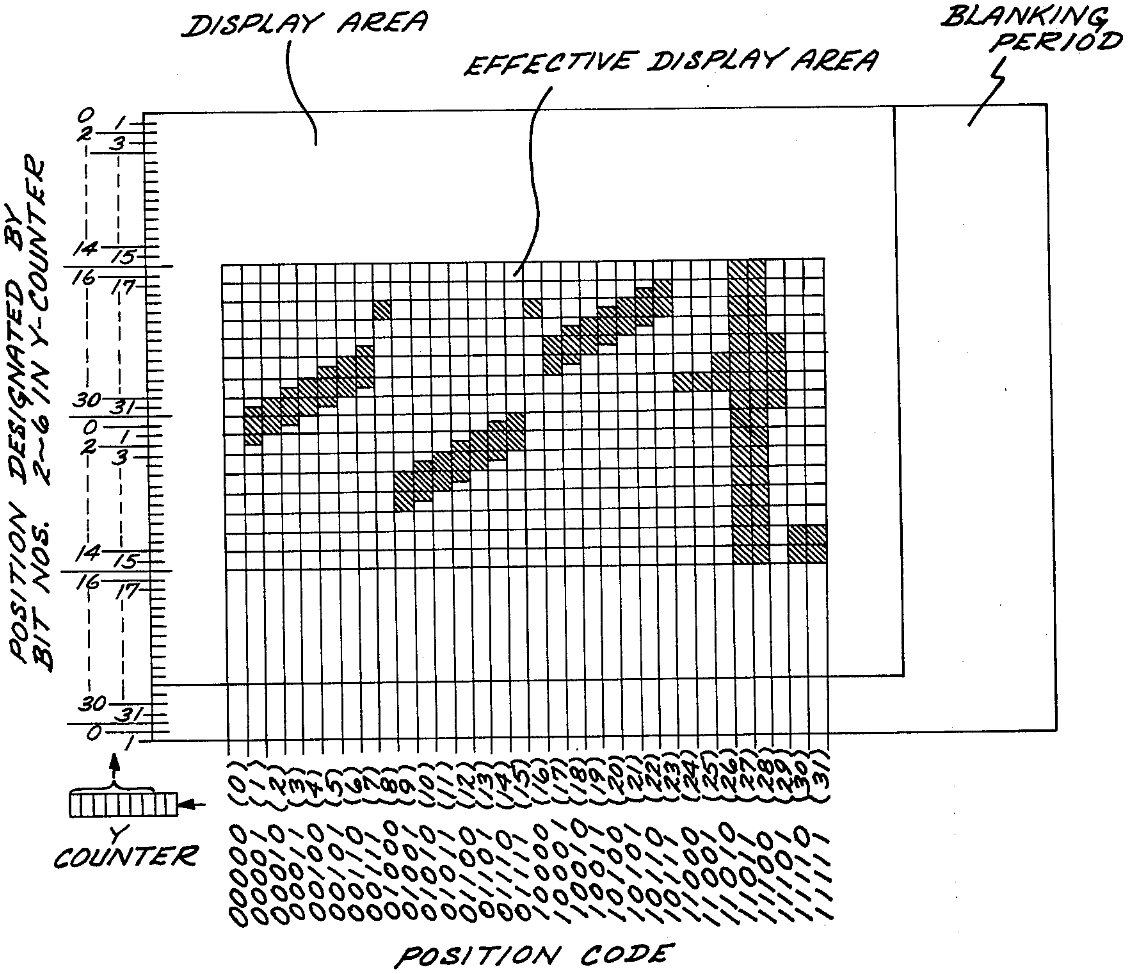

FIG. 9

Y-COUNTER BIT NO. 2-6

POSITION CODE

| | (0) 00000 | (1) 00001 | (2) 00010 | (3) 00011 | (4) 00100 | (5) 00101 | (6) 00110 | (7) 00111 | (8) 01000 | (9) 01001 | (10) 01010 | (11) 01011 | (12) 01100 | (13) 01101 | (14) 01110 | (15) 01111 | (16) 10000 | (17) 10001 | (18) 10010 | (19) 10011 | (20) 10100 | (21) 10101 | (22) 10110 | (23) 10111 | (24) 11000 | (25) 11001 | (26) 11010 | (27) 11011 | (28) 11100 | (29) 11101 | (30) 11110 | (31) 11111 |
|---|---|---|---|---|---|---|---|---|---|---|---|---|---|---|---|---|---|---|---|---|---|---|---|---|---|---|---|---|---|---|---|---|
| 00000(0) | | | | | | | | | | | | | | | | | | | | | | | | | | | | | | | | |
| 00001(1) | 1101 | 0110 | 1111 | | | | | | | | | | | | | | | | | | | | | | 1000 | | 1000 | | 1000 | | 1000 | 0100 |
| 00010(2) | 1110 | 0111 | | | | | | | | | | | | | | | | | | | | | | | 1000 | | 1000 | | 1000 | | 1100 | 0101 |
| 00011 (3) | 1111 | | | | | | | | | | | | | | | | | | | | | | | | 1000 | | 1000 | | 1000 | 0100 | 1101 | 0110 |
| 00100(4) | 1000 | | | | | | | | | | | | | | | | | | | | | | | | 1000 | | 1000 | | 1100 | 0101 | 1110 | 0111 |
| 00101 (5) | 1000 | | | | | | | | | | | | | | | | | | | | | | | | 1000 | | 1000 | 0100 | 1101 | 0110 | 1111 | |
| 00110 (6) | 1000 | | | | | | | | | | | | | | | | | | | | | | | | 1000 | | 1100 | 0111 | 1110 | 0111 | 1000 | |
| 00111 (7) | 1000 | | | | | | | | | | | | | | | | | | | | | | | | 1000 | 0100 | 1101 | 0110 | 1111 | | 1000 | |
| 01000(8) | 1000 | | | | | | | | | | | | | | | | | | | | 0100 | 0101 | | | 1000 | | 1000 | | 1000 | | 1000 | |
| 01001 (9) | 1000 | | 1000 | | 1000 | | 1100 | 0101 | 1110 | 0111 | | | | | | | | | | | | | | | 1000 | | 1000 | | 1000 | | 1000 | |
| 01010(10) | 1000 | | 1000 | | 1000 | 0100 | 1101 | 0110 | 1111 | | | | | | | | | | | | | | | | 1000 | | 1000 | | 1000 | | 1000 | |
| 01011(11) | 1000 | | 1000 | | 1100 | 0101 | 1110 | 0111 | | | | | | | | | | | | | | | | | 1000 | | 1000 | | 1000 | | 1000 | |
| 01100 (12) | 1000 | | 1000 | 0100 | 1101 | 0110 | 1111 | | | | | | | | | | | | | | | | | | 1000 | | 1000 | | 1000 | | 1000 | |
| 01101 (13) | 1000 | | 1100 | 0101 | 1110 | 0111 | | | | | | | | | | | | | | | | | | | 1000 | | 1000 | | 1000 | | 1000 | |
| 01110(14) | 1000 | 0100 | 1101 | 0110 | 1111 | | | | | | | | | | | | | | | | | | | | 1000 | | 1000 | | 1000 | | 1000 | |
| 01111(15) | 1100 | 0101 | 1110 | 0111 | | | | | | | | | | | | | | | | | | | | | 1000 | | 1000 | | 1000 | | 1000 | |
| 10000 16) | 1000 | | | | | | | | | | | | | | | | | | | | 0110 | 0111 | | | 1000 | | 1000 | | 1000 | | 1000 | |
| 10001 17) | 1000 | | | | | | | | | | | | | | | | | | | | | | | | 1100 | 0101 | 1110 | 0111 | 1000 | | 1000 | |
| 10010 18) | 1000 | | | | | | | | | | | | | | | | | | | | | | | 0100 | 1101 | 0110 | 1111 | | 1000 | | 1000 | |
| 10011 19) | 1000 | | | | | | | | | | | | | | | | | | | | | | 0100 | 0101 | 1110 | 0111 | 1000 | | 1000 | | 1000 | |
| 10100 20) | 1000 | | | | | | | | | | | | | | | | | | | | | 0100 | 0101 | 0110 | 1111 | | 1000 | | 1000 | | 1000 | |
| 10101 21) | 1000 | | | | | | | | | | | | | | | | | | | | 0100 | 0101 | 0110 | 0111 | 1000 | | 1000 | | 1000 | | 1000 | |
| 10110 22) | 1000 | | | | | | | | | | | | | | | | | | | 0100 | 0101 | 0110 | 1111 | | 1000 | | 1000 | | 1000 | | 1000 | |
| 10111 23) | 1000 | | | | | | | | | | | | | | | | | | 0100 | 0101 | 0110 | 0111 | 1000 | | 1000 | | 1000 | | 1000 | | 1000 | |
| 11000 24) | | | | | | | | | | | | | | | | | | | | | | | | | | | | | 0100 | 0111 | | |
| 11001 25) | | | | | | | | | | | | | | | | | | | | | | | | | | | | | 0110 | 0111 | | |
| 11010 26) | | | | | | | | | | | | | | | | | | | | | | | | | | | 0100 | 0101 | 0110 | 0111 | | |
| 11011 27) | 0110 | 0111 | 0110 | 0101 | 0110 | 0111 | 0100 | 0101 | 0110 | 0111 | 0100 | 0101 | 0110 | 0111 | 0100 | 0101 | 0110 | 0111 | 0100 | 0101 | 0110 | 0111 | 0100 | 0101 | 0110 | 0111 | 0100 | 0101 | 0110 | 0111 | 0100 | 0101 |
| 11100 28) | 0100 | 0101 | 0110 | 0111 | 0100 | 0101 | 0110 | 0111 | 0100 | 0101 | 0110 | 0111 | 0100 | 0101 | 0110 | 0111 | 0100 | 0101 | 0110 | 0111 | 0100 | 0101 | 0110 | 0111 | 0100 | 0101 | 0110 | 0111 | 0100 | 0101 | 0110 | 0111 |
| 11101 29) | 1000 | | | | | | | | | | | | | | | | | | | | | | | | 1100 | 0101 | 1110 | 0111 | 1110 | 0111 | 1100 | 0101 |
| 11110 30) | 1000 | | | | | | | | | | | | 0100 | 0101 | 0110 | 0111 | | | | | | | | | 1000 | | 1000 | | 1000 | | 1000 | |
| 11111 31) | | | | | | | | | | | | | 0100 | 0101 | 0110 | 0111 | | | | | | | | | | | | | | | | |

DIGITAL PATTERN DISPLAY SYSTEM

BACKGROUND OF THE INVENTION

The present invention is directed to a display system for displaying selectable predetermined patterns on a cathode ray tube (CRT). Specifically, the disclosed system is directed to a pattern display system for use in conjunction with musical composition wherein musical notation and indicia indicative of musical composition are displayed on a CRT.

Digital display systems for displaying data from a source of digital information such as a computer are well known. Typically, such systems generally include a central processing unit for performing data processing tasks, such as the input and output of digital data, as well as the storage of digital data in some form of storage such as tape, disk, or core memory. Information is generally entered into the system through a keyboard, a punched card reader, or some other form of permanent storage which is machine readable. Generally, in such prior art systems, data is displayed on a cathode ray tube through the use of storage circuitry and display circuitry for appropriately retrieving stored information for display.

For example, a read-only memory can be utilized to provide character generation in response to being accessed through the use of code words. Such read-only memory systems can be used to display standard alphanumeric characters or predefined characters for special uses. An example of such a video display system is shown in U.S. Pat. No. 4,075,620, issued to Passavant et al. on Feb. 21, 1978, which is entitled VIDEO DISPLAY SYSTEM. U.S. Pat. No. 4,054,868, issued to Rose on Oct. 18, 1977, entitled ELECTRONIC MUSICAL SCALE AND CHORD DISPLAY APPARATUS, discloses a display apparatus which utilizes programmable read-only memories to control light emitting diode display elements, and is not directed to CRT display systems.

However, prior art CRT display systems are generally complicated, requiring extensive storage for data representative of each character displayed and storage output buffers. Further, prior art character display systems provide for the display and characters only in pre-defined character regions on the CRT display area, thus limiting the choice of locations where characters can be placed.

It is, therefore, an object of the disclosed invention to provide a CRT display system which does not require extensive data storage.

A further object of the invention is to provide a CRT pattern display system wherein pattern location is accurately and variably defined.

Still a further object of the invention is to provide a CRT display system which is particularly suited to display characters whose meaning is determined by vertical position on the display.

Another object of the disclosed invention is to provide an improved CRT display system wherein the circuitry for providing video signals includes read-only memories for providing display information in response to pattern information and timing information.

A further object of the invention is to provide an improved CRT display system wherein the timing operations for providing the video signals are relatively simple.

SUMMARY OF THE INVENTION

The foregoing and other objects are achieved by the subject invention through the utilization of recirculating shift registers, which registers include respectively display pattern information and display position information. The shifting of these shift registers is related to the horizontal scan of the CRT, and the horizontal positions of the patterns represented by the display pattern information are therefore implicit by the position within the shift register of the particular pattern code. The display position codes are indicative of the vertical positions of the corresponding patterns represented by the pattern codes. The outputs of these shift registers are used as part of the address for accessing read-only memories. The remaining portions of the read-only memory access addresses are defined by predetermined bits in a counter whose value is a function of the vertical scan position of the CRT. One of the read-only memories is utilized as a control for the video output to the CRT, and is also utilized to form part of the address for the other read-only memory which provides outputs indicative of the proper pattern to be displayed.

BRIEF DESCRIPTION OF THE DRAWING

The particular advantages and features of the disclosed invention can best be understood from the following detailed description of the disclosure when read in conjunction with the drawing wherein:

FIG. 3 is a circuit diagram of an audio circuit which can be used in the display system shown in FIG. 1;

FIG. 4 illustrates (*a*) an exemplary prior art CRT display format, and (*b*) the CRT display format of the disclosed pattern display system;

FIG. 6 illustrates in exemplary form musical indicia provided by the disclosed pattern display system;

FIG. 7 illustrates vertical display position as a function of position code for the disclosed pattern display system;

FIG. 9 is a table showing the contents of a read-only memory which forms part of the video circuit shown in FIG. 8;

DETAILED DESCRIPTION OF THE DISCLOSURE

Figure 1:
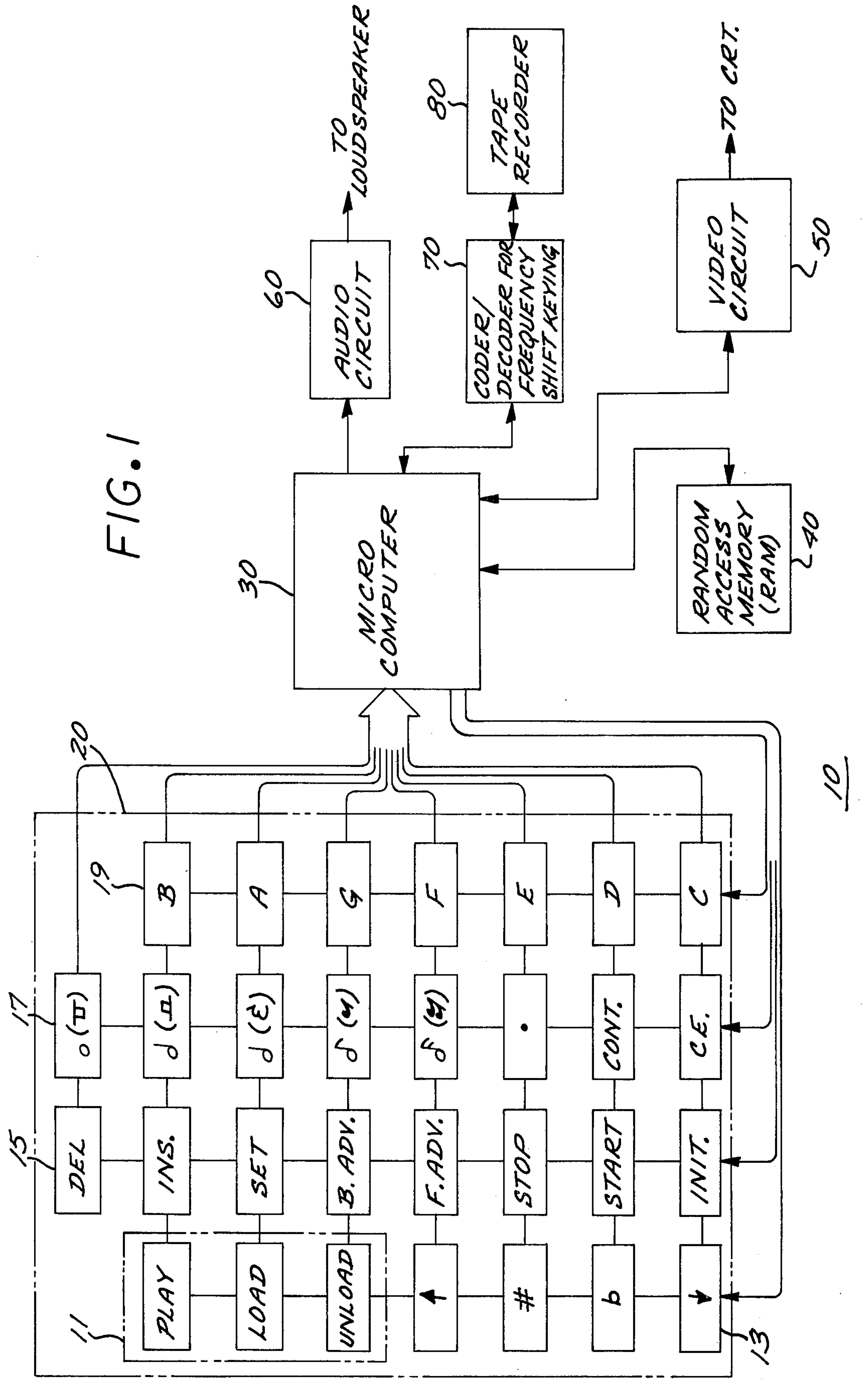
FIG. 1 is a block diagram representation of the disclosed digital pattern display system, and also shows in detail a keyboard for use in such display system.

The disclosed digital pattern display system is shown in block diagram form in FIG. 1, and is shown as being embodied in a musical composition system. The musical composition system, generally designated by the reference numeral 10, includes a specialized keyboard 20 which is in the form of a matrix switching arrangement with a microcomputer 30. The system 10 further includes a random access memory (RAM) 40 which is coupled to the microcomputer 30 and a video circuit 50, which is also coupled to the microcomputer 30. An audio circuit 60 is provided for generating electrical audio signals representative of the musical notes inputted by the microcomputer 30 and stored in the RAM 40 upon appropriate control by the microcomputer 30, as determined by the inputs from the keyboard 20. The audio output provided by the audio circuit 60 is appropriately connected to a loud speaker (not shown). The system 10 shown in FIG. 1 further includes an optional frequency shift keying coder/decoder 70 for use in recording upon magnetic tape controlled by a tape recorder 80. Upon appropriate control of the microcomputer 30, the coder/decoder 70 is capable of frequency shift key coding of digital information stored by the microcomputer 30, and provides such coded information to the tape recorder 80. Also, the coder/decoder 70 can accept the output from the tape recorder 80, decode the tape recorder information, and provide the corresponding digital information to the microcomputer 30.

The keyboard 20 includes a group of three keys referenced by the numeral 11 in the first column 13 of keys in the keyboard 20. The three keys 11 control the status of the musical composition system and are identified as PLAY, LOAD and UNLOAD. The keys 11 are preferably interlocked such that only one key can be actuated at one time. The specific functions of the keys 11 will be discussed further below. The first column 13 of keys in the keyboard 20 further includes a key designated with an upward vertical arrow (↑) indicating the function of selection of the higher octave of a three-octave range which the system 10 can handle. This key can also serve a further function with the use of a CONTROL key which will be discussed in conjunction with the third column of keys in the keyboard 20. The first column 13 further includes symbol keys having sharp and flat symbols, which are used as note modifiers, and a key designated with a downward vertical arrow (↓) which indicates the selection of the lowest octave of the three-octave range of the system 10. As with the upward vertical arrow, the downward vertical arrow key can be used for another function with the use of the CONTROL key.

A second column 15 of keys in the keyboard 20 includes the following function keys: DELETE, INSERT, SET, BACKWARD ADVANCE, FORWARD ADVANCE, STOP, START and INITIATE. The specific functions defined by these keys are discussed further below.

A third column 17 of keys in the keyboard 20 include keys indicative of the desired note duration. Starting at the top of the column 17, these keys indicate a full note, a half note, a quarter note, an eighth note, and a sixteenth note, respectively. As shown by the pause symbols parenthetically indicated on the note duration keys, these same keys can also be used to indicate the duration of any pauses. Further, in the third column 17 are the dot (.), CONTROL and CLEAR ENTRY keys. The dot key is used to modify the prior described note duration keys to indicate that the desired note duration is 1.5 times what was indicated by one of the note duration keys. The CONTROL key is utilized to allow particular keys in the keyboard 20 to serve dual functions. The CLEAR ENTRY key is utilized to clear information entered into the data buffers via the keyboard 20, as described below.

The fourth column 19 of the keys in the keyboard 20 includes keys which indicate the particular tone of the desired note.

The keys in the keyboard 20 are used to control the operation and function of the musical composition system 10, and are particularly used to control entry and storage of musical data, editing of stored musical data, display of stored musical data, and outputting of electrical audio signals indicative of stored musical data. Actuation of the following keys will signal the microcomputer 30 that certain patterns are to be stored and displayed:

(i) The flat and sharp keys in the first column 13;

(ii) The upward arrow (↑) and the downward arrow (↓) keys in the first column 13 when used in conjunction with the CONTROL key in the third column; and (iii) The top six note and pause duration keys in the third column 17 of the keyboard 20.

Actuation of the following keys will signal the microcomputer 30 that the desired pattern or patterns are to have certain vertical locations on the musical staff:

(i) The upward arrow (↑) and downward arrow (↓) keys in the first column 13; and (ii) The tone value keys in the fourth column 19.

When information is desired to be entered through the keyboard 20, the INITIATE key is first depressed to signal the microcomputer 20 to prepare for accepting the input data as defined by the appropriate key strokes on the keyboard 20. The input of information is accomplished through the use of two buffer bytes B1 and B2, each of which has eight bits. Table I illustrates generally the formats of bytes B1 and B2. The bit positions which are controlled by associated keys have the key symbols shown where it is convenient to do so. Bit positions 0 through 2 of byte B1 are coded in accordance with the actuation of tone value keys in the fourth column 19 of the keyboard 20 and are therefore left blank. Bit numbers 1 through 5 of byte B2 are used to indicate note or pause duration, and are also left blank in Table I. Bit numbers 7 of B1 and 6 and 7 of B2 are special purpose bits used in conjunction with the CONTROL key, described more fully below, and therefore are shown with zeros.

TABLE I

| Bit Nos. | 7 | 6 | 5 | 4 | 3 | 2 | 1 | 0 |
|---|---|---|---|---|---|---|---|---|
| B1 | 0 | # | b | ↑ | ↓ | (Tone) | | |
| B2 | 0 | 0 | (Note or pause duration) | | | | | (Dot). |

Byte B1 is used to store tone information, including octave and whether it is a flat, sharp or normal note. The B2 byte is used to store note duration information. Specifically, it is contemplated that bit numbers 0 through 2 of B1 represent the tone as selected by one of the keys in the fourth column 19 of the keyboard 20. Table II sets forth in decimal notation the value placed into bit numbers 0 through 2 of byte B1 when certain tone value keys are actuated.

TABLE II

| Tone Key | B1 Bit Nos. 0–2 (Decimal) |
|---|---|
| C | 1 |
| D | 2 |

TABLE II-continued

| Tone Key | B1 Bit Nos. 0–2 (Decimal) |
|---|---|
| E | 3 |
| F | 4 |
| G | 5 |
| A | 6 |
| B | 7 |

If neither of the arrow keys (↑) (↓) has been actuated, then bit numbers 3 and 4 of B1 are logical zeroes, thereby indicating that the note is in the middle octave. Bit numbers 5 and 6 represent whether the flat or sharp keys in the first column 13 have been depressed.

With respect to bit numbers 3 through 6 of byte B1, depression of a particular key will cause a logical one to be stored in the bit position associated with the actuated key, as shown in Table I. It should be noted that if the contents of bits 3 and 4 are both logical zeroes, the particular note chosen is in the middle octave. Since the value of the contents of bits 3 and 4 are indicative of the particular octave chosen, it should be clear that these bits cannot simultaneously contain logical ones. If bit numbers 5 and 6 of byte B1 are both logical zeroes, then the chosen note is neither flat nor sharp. Also, since a particular note cannot be both sharp and flat, the contents of bits 5 and 6 cannot simultaneously be logical ones.

With respect to byte B2, bit number 0 represents whether the dot note duration modifying key has been depressed. Bit number 1 indicates whether the 1/16 duration key has been depressed. Bit number 2 indicates whether the ⅛ duration key has been actuated. Bit number 3 indicates whether the ¼ duration key has been depressed. Bit number 4 indicates whether the ½ duration key has been depressed. Bit number 5 indicates whether the full note duration key has been depressed. If a particular key has been actuated, then the corresponding bit position will contain a logical one. It should be noted that with respect to bits 1 through 5 of byte B2, only one of these bits can, at any one time, have a logical one content. Of course, bit number 0 can be logical one or zero at any time since it modifies the standard note durations represented by bit numbers 1 through 5.

If a pause is desired, then none of the tone keys in the fourth column 19 should be actuated, and the appropriate key in the third column 17 indicative of the desired pause duration should be actuated. This procedure will leave the contents of byte B1 to be all logical zeros, and the appropriate time duration information will be in byte B2.

Thus, with appropriate key strokes on the keyboard 20, bytes B1 and B2 can store note value and time duration information for a musical range of three octaves. If the musical information entered through key strokes into bytes B1 and B2 is wrong, then depression of the CLEAR ENTRY key will cause the microcomputer 30 to appropriately reset the contents of bytes B1 and B2 to logical zeros. Briefly, then, bit numbers 0 through 2 of byte B1 define the alphabetic representation of the tone of an input note, and bits 3 through 6 of byte B1 define specifically the octave and any half-step (sharp or flat) modification of said input note. Bit numbers 1 through 5 of byte B2 define the time duration of the note or pause defined by byte B1, and bit number 0 of byte B2 modifies the time duration defined by the contents of one of bit numbers 1 through 5 of byte B2.

Actuation of the CONTROL key in the third column 17 of the keyboard 20 will cause bit number 7 of both bytes B1 and B2 to be logical ones. Subsequent actuation of the arrow keys (↑) (↓), the dot (.) key, or the 1/16 duration key will cause the appropriate bit in B1 or B2 to contain a logical one, accordance with Table I. Thus for purposes of display or audio output, the microcomputer 30 can recognize that the contents of B1 and B2 define particular symbols when bit number 7 of B1 and B2 are logical ones. Specifically, with reference to FIG. 1, those symbols are the start of music repetition, end of music repetition, end of music, and phrase boundary symbols.

If the keyed data entered through the keyboard 20 is correct and ready for storage, depression of the SET key will cause the contents of bytes B1 and B2 to be stored by the microcomputer 30 into the random access memory 40 in the next sequentially available adjacent locations. That is, in the course of musical composition, data entered via the keyboard 20 is entered into the random access memory 40 in a predetermined field which can be sequentially accessed. As previously indicated, each note or pause is defined by two bytes entered into bytes B1 and B2. This data is then sequentially stored in the random access memory 40 through the use of an address pointer which is controlled by the microcomputer 30 or by appropriate key strokes on the keyboard, as described further herein.

The function keys in the second column 15 of the keyboard 20 and the status keys 11 in the first column 13 of the keyboard will now be discussed. As indicated previously, the status keys 11 are preferably interlocked to allow only one key to be actuated at one time, and should also maintain on ON switch position after release of the actuating force. That is, if a particular key in the status group 11 is actuated, the connection made by such actuation is maintained even after the key is released. Alternatively, the microcomputer 30 can maintain the status defined by a certain status key actuation and can function in accordance with the current status.

Actuation of the LOAD key prepares the system 10 for the input of data from either the keyboard 20 or the optional frequency shift keying coder/decoder 70 as determined by subsequent actuation of one of the function keys in the second column 15 of the keyboard 20. If music composition through inputs from the keyboard 20 is desired, the INITIATE key must be depressed to indicate the start of composition to the microcomputer 30. Upon such actuation, the microcomputer 30 will initiate the appropriate functions to allow it to accept keyed-in information for storage into the random access memory 40. Particularly, upon the INITIATE actuation, the microcomputer 30 will reset its current address pointer such that the current address indicated is at the beginning of the particular field which has been defined for storage of the musical composition data entered through the keyboard 20. Also, upon actuation of the INITIATE key, the buffer bytes B1 and B2 are cleared to have logical zeros as the contents of all the bit positions. After the microcomputer 30 has thus been prepared for entry of the data, the appropriate data can be entered via the keyboard 20 as previously indicated. Actuation of the SET key will cause the entered musical data to be entered into the random access memory 40 and will also cause the address pointer to be properly incremented by two address positions.

If the musical data is to be entered through apparatus other than the keyboard 20, the LOAD key is set as before, but the START key is utilized to signal the microcomputer 20 to begin the process of loading information from a device other than the keyboard 20, such as the optional coder/decoder 70.

Unloading any stored musical data into optional devices such as the tape recorder 80 through the coder/decoder 70 is achieved by depressing the UNLOAD key and subsequently depressing the START key. This particular sequence notifies the microcomputer 30 that it is to control the transfer of musical data from the random access memory 40 to the coder/decoder 70.

During the process of musical composition through the keyboard 20, it is useful to be able to edit the contents of the random access memory 40. This is accomplished by the DELETE, INSERT, BACKWARD ADVANCE and FORWARD ADVANCE keys. Of course, it is understood that during such editing procedures, the musical composition system 10 will be in the LOAD status by virtue of proper actuation of the LOAD key. The FORWARD ADVANCE and BACKWARD ADVANCE keys are used to change the contents of the current address pointer, thereby allowing the address pointer to reference a particular location in the random access memory 40. The INSERT key is utilized to insert at a particular address, referenced by the address pointer, musical data appropriately entered into bytes B1 and B2. Use of the INSERT key will cause the microcomputer 30 to shift down all data stored after the address referenced by the address pointer, thereby allowing the insertion of the data in bytes B1 and B2 into the locations vacated by the down shift of data. The DELETE key signals the microcomputer 30 to cause an upward shift of all data stored after the address referenced by the address pointer thereby deleting the data stored at the address referenced by the address pointer.

It should be noted at this point that the address pointer is incremented or decremented in steps corresponding to two address locations, since as indicated previously the data stored in the random access memory 40 is in the form of two bytes corresponding to data buffer bytes B1 and B2. Thus, all upshifts and downshifts are by increments of two address locations thereby allowing the insertion of two data bytes or the deletion of two data bytes.

After the musical data has been stored in the random access memory 40, the audio circuit 60 can appropriately be utilized by the microcomputer 30 to cause the audio playback of the musica represented by the musical data stored in the random access memory 40. This procedure involves placing the musical composition system 10 in the PLAY status by appropriately actuating the PLAY key in the first column 13 of the keyboard 20. The actuation of the PLAY status key indicates to the microcomputer 30 that playback of the musical data stored in the random access memory 40 is desired. Subsequent actuation of the INITIATE key will cause the address pointer, under the control of the microcomputer 30, to be reset to reference the beginning address of the field within the random access memory 40 wherein the musical data is stored. Thus, upon actuation of the INITIATE key when the musical composition system 10 is in the PLAY status (as determined by the PLAY key), the microcomputer 30 will appropriately reset the address pointer to the beginning of the musical composition data and appropriately transfer the stored data to the audio circuit 60. Also, the microcomputer 30 controls the display of the stored data which is being played. The details of the video circuit 50 are described more fully hereafter.

Figure 2:
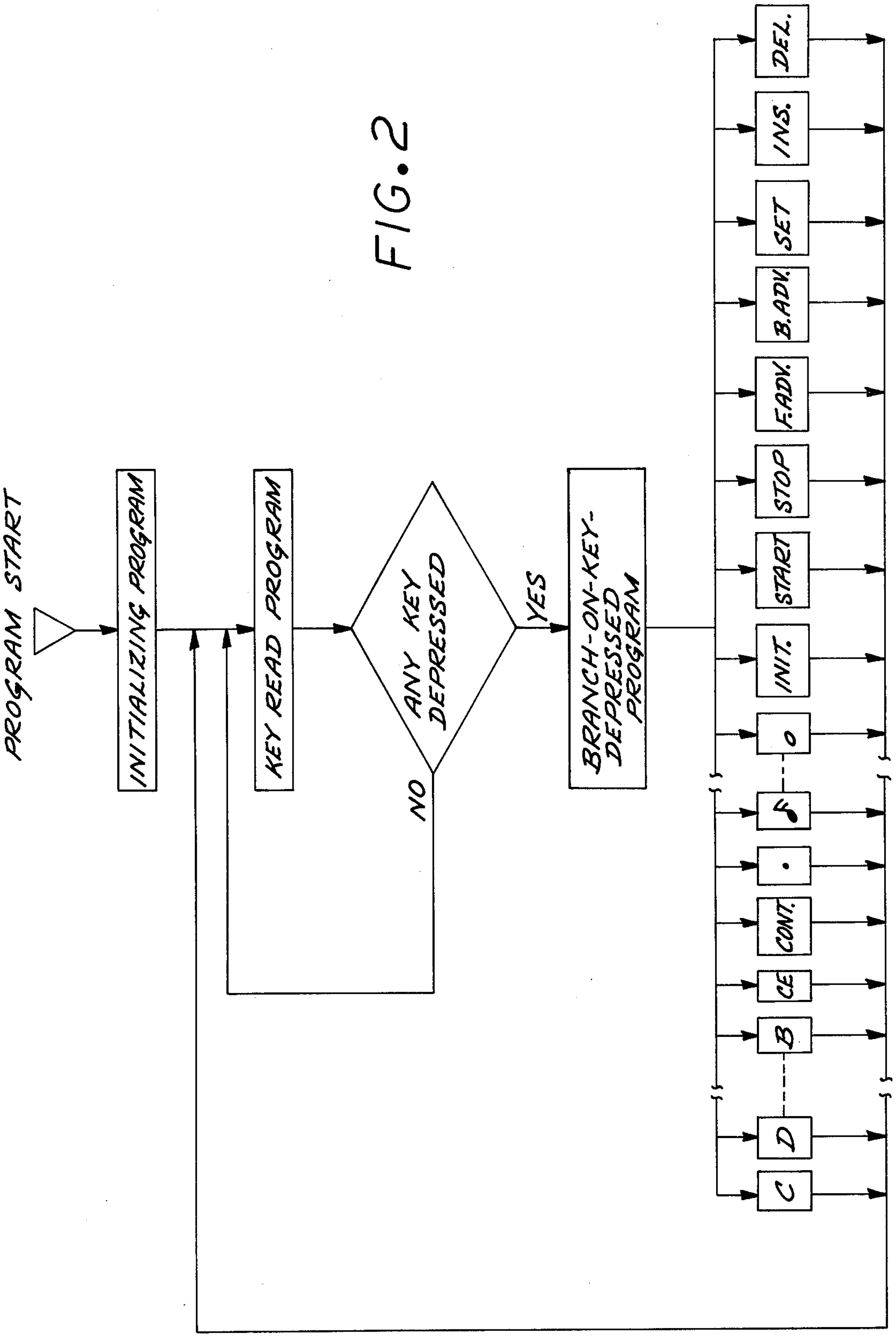
FIG. 2 is a flow chart of a procedure to be utilized by the microcomputer of the display system disclosed in FIG. 1 for interrogating the keyboard.

Generally, the foregoing functions of the microcomputer 30 can be accomplished by programming the microcomputer 30 to be responsive to the individual status keys PLAY, LOAD, and UNLOAD for appropriately preparing for the acceptance of data, for example, from the keyboard 20. Subsequent to such initial preparation, the microcomputer 30 can then utilize various programs to interrogate the keyboard 20 to determine whether any key has been depressed, and to execute appropriate programs upon the determination that particular keys have been depressed. That is, the microcomputer 30 is adapted to respond in a particular fashion to a particular keystroke. A flow chart of a process which can be used by the microcomputer 30 for responding to keyboard inputs is illustrated in FIG. 2.

For the purpose of providing output data to the audio circuit 60, it is contemplated that the musical data stored in the random access memory 40 is sequentially read out into the B1 and B2 buffer bytes, which data is then subsequently reformed into output data in a pair of output buffer bytes B3 and B4, respectively. Specifically, it is contemplated that the octave indicating bits of buffer byte B1 (bit numbers 3 and 4) are transferred to bit numbers 4 and 5 of buffer byte B3. The contents of byte B1 at bit locations 0 through 2 (indicative of tone), and 5 and 6 (indicative of flat or sharp) are represented in bits 0 through 3 of buffer byte B3 in accordance with Table III below. Specifically, Table III contemplates the coding of all possible 12 notes which can occur in an octave, with each note being identified by one of the decimal numbers 1 through 12 as shown in Table III. Table III is based upon the numerical (decimal) coding of musical tones in B1 bit numbers 0 through 2 as shown in the first two columns of Table III. Flat or sharp modifications which do not occur in musical composition are not shown.

TABLE III

| Tone | Bit Nos. 0–2 of B1 (decimal) | Modification (None, Flat or Sharp) | Bit Nos. 0–3 of B3 (decimal) |
|---|---|---|---|
| C | 1 | none | 1 |
| | | # | 2 |
| D | 2 | b | 2 |
| | | none | 3 |
| | | # | 4 |
| E | 3 | b | 4 |
| | | none | 5 |
| F | 4 | none | 6 |
| | | # | 7 |
| G | 5 | b | 7 |
| | | none | 8 |
| | | # | 9 |
| A | 6 | b | 9 |
| | | none | 10 |
| | | # | 11 |
| B | 7 | b | 11 |
| | | none | 12 |

With respect to buffer byte B2, the contents of all bit positions of B2 are transferred to B4 except for bit number 0 of buffer byte B2. As discussed previously, bit number 0 of B2 indicates whether the standard note duration is to be modified to indicate that the actual note duration is one and one-half times the duration indicated by the note symbol (corresponding to a dot adjacent the note representation). If bit number 0 of byte B2 contains a logical one, then the least significant bit position in B4 adjacent the bit position in B4 having a logical one content is also caused to have a logical one as its content.

Thus, the buffer byte B3 includes a numerical representation of the note value along with octave information. Buffer byte B4 includes a numerical representation of the time duration of the particular note represented in buffer byte B3.

FIG. 3 illustrates in exemplary form specific details of the audio circuit 60 and includes appropriate circuitry for providing audio signals to a loudspeaker. Specifically, the audio circuit 60 includes a frequency generator 21 which is capable of generating the 12 tones associated with the highest octave of the three octave range in which the musical composition system 10 is capable of operating. The frequency generator 21 is coupled to prescaler 23 which utilizes the clock of the microcomputer 30 to provide a reduced clock for the frequency generator 21. A demultiplexer 27 is responsive to bit Nos. 0 through 3 of buffer byte B3 (indicative of the tone) as provided through an output port of the microcomputer 30. The output of the demultiplexer 27 will therefore be a signal having a frequency corresponding to a particular tone in the highest octave. Therefore, if bit numbers 4 and 5 in buffer byte B3 indicate that the desired note is in one of the lower two octaves, appropriate divisions by a factor or two or four will have to be performed to provide a signal with the appropriate frequency. As is well known, the relationship between a particular tone in one octave and the same tone in an adjacent octave is that the frequency of the higher note is twice the frequency of the lower note. A pair of serially connected dividers 29 and 31 are provided for generating at their respective output signals having frequencies that are one-half and one-fourth, respectively, of the output signal of the demultiplexer 27.

Therefore, it is evident that the output of the demultiplexer 27, the output of the divider 29, and the output of the output 31, provide signals which correspond to the same tones in the three octaves covered by the musical composition system. A decoder 33 is responsive to bit numbers 4 and 5 of the buffer byte B3 (indicative of the desired octave), and appropriately controls AND-GATES 35, 37 and 39 to allow for the transmission of the appropriate frequency. An OR-GATE 41 accepts the output of the AND-GATE 35, 37 and 39, and transmits to a loudspeaker the appropriate output as determined by one of the outputs of the AND-GATE 35, 37, and 39.

The information in buffer byte B4 is utilized by the microcomputer 30 to control the timing of the duration of a particular output note. Specifically, in response to the timing information in B4, the microcomputer 30 will provide an output to the demultiplexer 27 only for the time period which corresponds to the note duration defined by buffer byte B4.

Thus, it is readily understood that the audio circuit 60 shown in FIG. 3 is responsive to the musical data as set forth in buffer bytes B3 and B4. Of course, it would be possible to use the output of the OR-GATE 41 to control an analog switch which is responsive to a digital analog converter, which in turn receives envelope data from the microcomputer 30. In such a modification, the output signals of the analog converter are modified by an analog switch, thereby providing as the output of the analog switch an audio signal for application to a loudspeaker.

During the musical composition process through the keyboard 20, it is desirable to visually display on a cathode ray tube (CRT) musical indicia corresponding to the data that is stored in the random access memory 40. Particularly, it is contemplated for the musical composition system 10 that actuation of the SET key on the keyboard 20 will cause both the storage of the musical data in the random access memory 40 (as discussed previously) and the display on a CRT via the video circuit 50 of musical indicia corresponding to the stored data. In the disclosed system it is particularly contemplated that such display on a CRT is accomplished without the use of an extensive display memory. It is further contemplated that the video display provide accurate character placement, such that the positions of symbols are not limited to predetermined character lines.

Prior art devices generally utilize a display buffer memory which has a one to one correspondence with predetermined regions of the CRT screen. For example, in a usual prior art character display device used with a computer terminal, the CRT display screen is divided into an area having 16 horizontal lines with each line capable of displaying 80 characters. For such a display, a total display buffer area required for storing each individual character would be 1,280 bytes. Such apparatus including extensive display buffer memories is avoided by the particular video display apparatus disclosed herein. Further, the video display apparatus described below avoids the prior art limitation that characters or symbols were positioned only on predetermined character or symbol lines.

The following disclosure of circuitry for providing video signals particularly adapted to musical composition can best be understood by recognizing that musical symbols include standard symbols, such as a flat or sharp symbol adjacent a note, and that the major differences between one note and another note include position in the music staff and different patterns indicating note duration. It should also be recognized that musical notation is not based upon characters being in fixed parallel lines such as is found in standard alphabetic texts. The disclosed video display circuitry therefore provides for the display of characters which can be precisely positioned with respect to each other, and with respect to a predefined display reference.

For purposes of comparison, reference is made to FIG. 4, wherein FIG. 4(*a*) illustrates the display format of a prior art CRT character display and FIG. 4(*b*) illustrates partially the display format of the disclosed pattern display system. With respect to FIG. 4(*a*), characters can be placed only within defined retangular regions, which for purposes of illustration are defined by a grid pattern which does not actually appear on a CRT. However, the point should be clear that with prior art devices, characters can be positioned only within areas defined by the grid.

In the disclosed pattern display system, the placement of symbols is not so restrictive, as shown in FIG. 4(*b*). The numbers 1, 2, 3, . . . 31, 32 across the top of FIG. 4(*b*) are used to designate vertical areas within which patterns can be displayed. That is, each vertical area defines an area of one pattern width. As can be seen from the exemplary musical symbols shown in FIG. 4(*b*), a single note can be a composite of more than one pattern. For example, the middle note in FIG. 4(*b*), in vertical areas 3, 4 and 5, includes a sharp symbol pattern, the head portion of a note symbol, and the stem and flag portion of a note symbol. It should also be readily evident that the vertical positions of the respective patterns in FIG. 4(*b*) are not limited to fixed character rows as those defined by the grid in FIG. 4(*a*). That is, the display of the disclosed invention, as shown in FIG. 4(*b*), does not require that the displayed symbols be in a straight row across the CRT. The result is the display of symbols with vertical positional steps that are smaller than the steps in the prior art.

As will be discussed more fully below in conjunction with the video display circuitry, the disclosed system defines each pattern with a unique 5-bit code. Each pattern defined by a 5-bit code comprises a rectangular area that is an 8 by 16 matrix of display dots. The 8-dot width corresponds to the width of each of the numbered vertical areas in FIG. 4(*b*).

Figure 5:
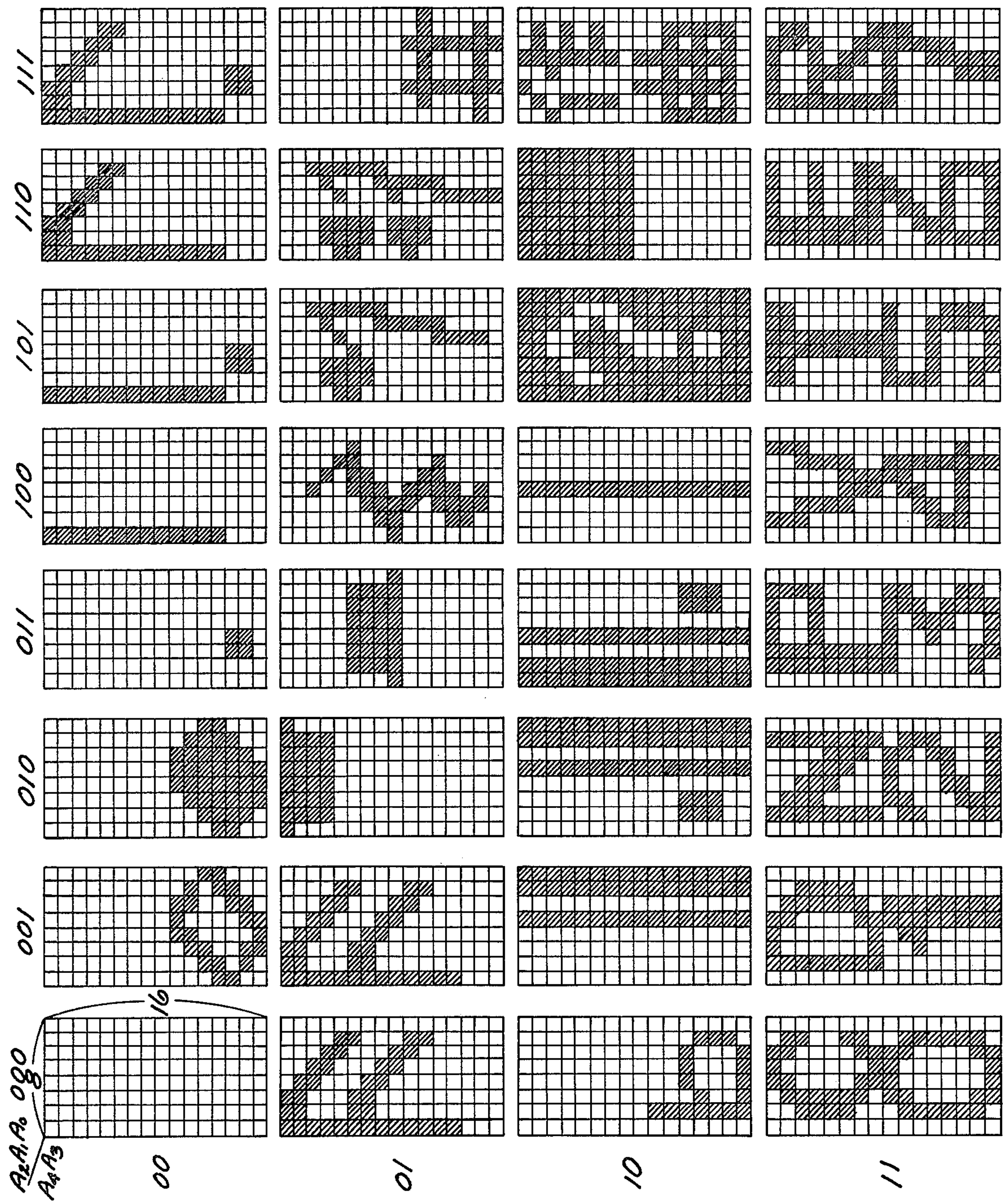
FIG. 5 illustrates the various patterns and corresponding pattern codes utilized in the disclosed pattern display system.

FIG. 5 illustrates the patterns that are associated with the particular 5-bit pattern codes. For illustration purposes, the patterns have been arranged in a matrix with the two most significant bits (left-most) of the pattern code being used to define the row of the corresponding pattern. These bits appear below the designation "$A_4A_3$". The remaining three bits are used to define the column of the corresponding pattern and appear to the right of the designation "$A_1A_2A_0$". The shaded areas represent display dots which are illuminated. For example, the pattern code 00100 defines the pattern for the stem of a quarter or half note symbol, and the pattern code 01111 defines the sharp symbol.

FIG. 6 illustrates an example of the use of the patterns in FIG. 5 to form musical indicia. The staff lines shown are provided by the read-only memories of video display circuitry discussed further below. The patterns are shown with the designation of the corresponding pattern codes.

In order to define the vertical position of a pattern (represented by a pattern code), a 5-bit position code is associated with each pattern code. As will be discussed more fully herein, the pattern codes are stored in a recirculating shift register, and the corresponding vertical position codes are stored in another recirculating shift register. For present purposes it suffices to state that horizontal display position is a function of the position within the shift registers of the respective pattern and position codes. For example, for the musical indicia on FIG. 6, the corresponding pattern codes would be in three adjacent locations in the pattern code shift register; and the corresponding position codes are in three adjacent locations in the position code shift register. Since the vertical positions of all three patterns are the same, the respective position codes are the same.

FIG. 7 illustrates the contemplated display positions and the corresponding vertical position codes. Each small rectangle represents a pattern area and indicates the veritcal position represented by the corresponding position code. The shaded portion of each pattern area indicates that portion of the pattern area wherein display will occur. Particularly, it can be seen that certain vertical position codes represent pattern areas wherein only the bottom or top haves are shaded. This indicates that patterns designated to have vertical positions corresponding to half display areas shown in FIG. 7 will have only their bottom or top halves displayed. That is, only half of the pattern from FIG. 5 will be displayed. The predetermined half display areas are provided so that two symbols can be incorporated into one pattern, as exemplified by the bottom row of patterns in FIG. 5 (pattern codes 11000 through 11111).

The decimal numbers along the left side of FIG. 7 are indicated as being the value of bit numbers 2 through 6 of a Y-counter, which is part of the video display circuitry described below. Briefly, the Y-counter controls the incremental vertical scan of the CRT used for display, and bit numbers 2 through 6 of the Y-counter are used to vertically divide each pattern area into four smaller areas, herein referred to as "subregions." Each of these subregions is an $8\times4$ matrix of display dots, thereby resulting in a pattern area that is an $8\times16$ matrix. Thus, each vertical pattern area has four numbers associated with it which are provided by bit numbers 2 through 6 of the Y-counter. Each of said numbers, therefore, designates one of the four subregions within each pattern area.

It should further be noted that FIG. 7 clearly shows the vertical positioning capabilities of the disclosed system. Specifically, as contrasted from the prior art, the pattern areas are not limited to areas defined by an orthogonal grid.

Figure 8:
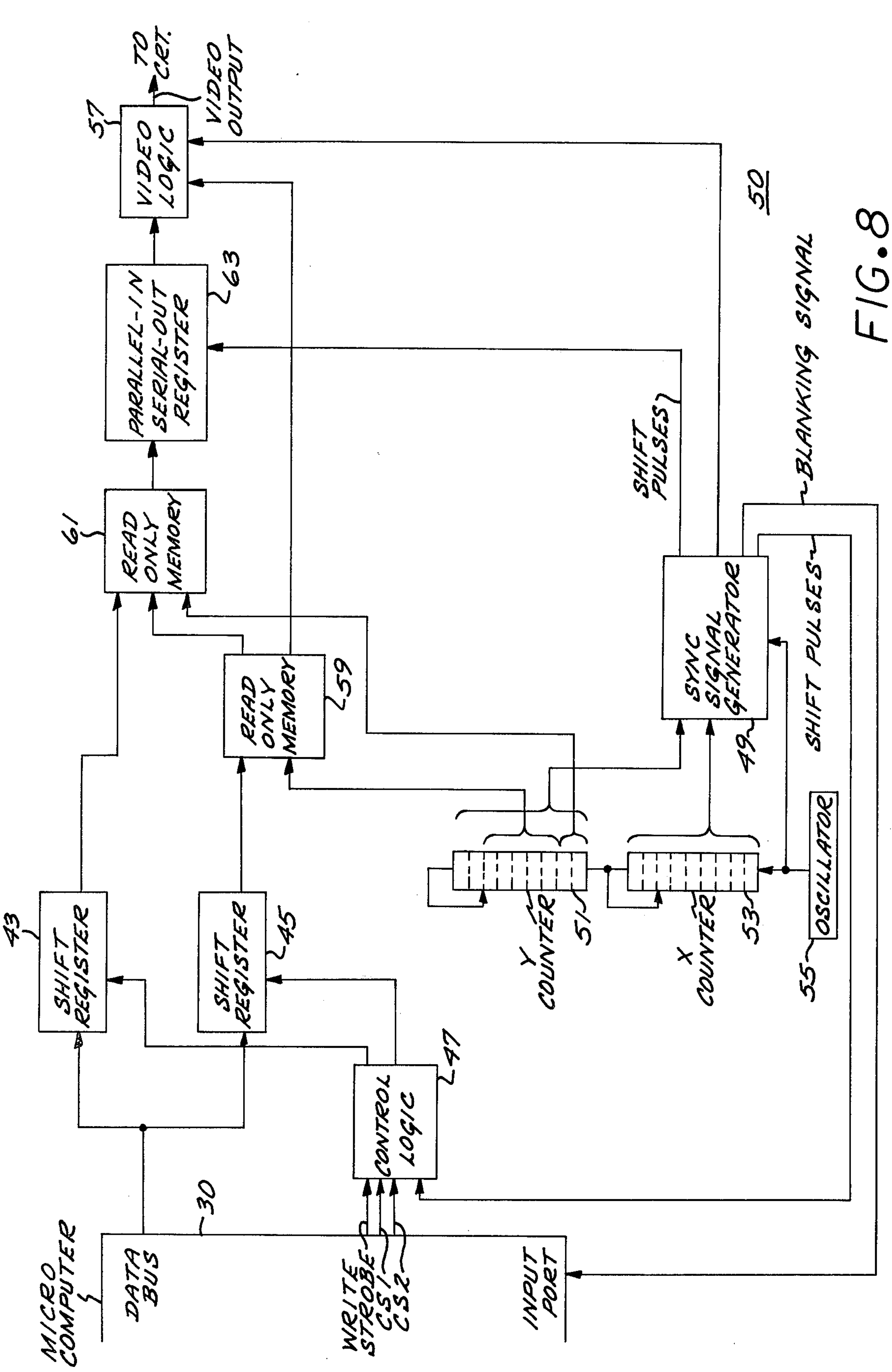
FIG. 8 is a schematic diagram of a video circuit for use in the display system of FIG. 1.

FIG. 8 sets forth the specific circuitry of the video circuit 50, and includes a first shift register 43 for storing pattern codes and a second shift register 45 for storing position codes. Each of the registers 43 and 45 is a recirculating type register which accepts data from the microocomputer 30 and are appropriately shifted by a control logic 47. Each of the shift registers 43 and 45 maintains 32 codes, with each code comprising five binary bits. The particular references to "pattern" and "position" codes are to pattern codes in accordance with FIG. 5 and position codes in accordance with FIG. 7. The control logic 47 causes the shift registers 43 and 45 to be in either a recirculate mode or write mode. In the absence of a WRITE strobe and CHIP SELECT signals (CS1 and CS2), the shift registers 43 and 45 are in the recirculate mode, and the control logic 47 provides appropriate shift pulses to the registers. The shift pulses are provided to the control logic 47 by a synchronizing signal generator 49 which is controlled by the outputs of a Y-counter 51, an X-counter 53, and an oscillator 55. The WRITE strobe received by the control logic 47 from the microcomputer 30 is controlled to be available only when the CRT (which accepts the video output of the video circuit 50) is in the blanking period. Such control is provided by the BLANKING signal received by the microcomputer 30 input port from the synchronizing signal generator 49.

In order to write pattern codes and position codes into the shift registers 43 and 45, the microcomputer must utilize the information stored in the RAM 40 or information entered via the keyboard 20. If information retrieved from the RAM 40, the retrieved information is placed in buffer bytes B1 and B2 such that the contents of B1 and B2 are coded in the same manner as when the information was originally entered via B1 and B2. If the information is entered via the keyboard 20, then B1 and B2 are also used, as previously described. If the pattern to be displayed is a note symbol or a note with a note modifier (flat or sharp), then the position code associated with the patterns used to display such note or note and modifier is defined by bit numbers 0 through 4 of B1. This is illustrated by FIG. 7 and Tables I and II, described above. The positions corresponding to certain position codes were chosen to achieve this result since tone is defined in an octave by vertical position (Table II); and the particular octave of a note is defined by B1 (Table I).

It should be noted that although complete note information is contained in B1 and B2, the associate pattern codes provided by the microcomputer may be more than one. For example, a one-quarter note requires two pattern codes (00010 and 00100 from FIG. 5). A sharp one-quarter note would require three pattern codes (01111, 00010, and 00100). Of course, for each pattern used for a note defined by the particular content of B1 and B2, there would be a corresponding position code, with all position codes being the same for all patterns used to define a note symbol.

With respect to pause symbols as defined in B1 and B2, the microcomputer 30 will recognize that a pause is to be displayed since the content of B1 will be all zeroes. The microcomputer 30 therefore provides to the shift registers 43 and 45 the appropriate pattern code (depending on duration as defined by B2), and the preselected position code 00110 (decimal 6). With reference to FIG. 5, pause symbol patterns are defined by pattern codes 01010 through 01110.

With respect to B1 and B2 contents that are defined by use of the CONTROL key, the microcomputer 30 recognizes such symbols since B1 and B2 contain logical ones in their bit number 7 position. The microcomputer 30 defines the appropriate pattern code as a function of the remaining bits of B1 and B2. The pattern codes associated with CONTROL key symbols are 10001 through 10100. As will be discussed more fully hereafter, the patterns represented by these pattern codes associated with the CONTROL key are only part of the entire symbol to be displayed. These pattern codes are used with the special position code 11101 (decimal 29) which is provided to the position code shift register 45 by the microcomputer 30. This special position code will cause the video circuit 50 to display the complete pattern.

The oscillator 55 also clocks the X-counter 53 which resets itself after a count of 384 (decimal) is reached. Upon reset of the X-counter 53, the Y-counter 51 is clocked to increment its contents by one. The Y-counter continues to count in this fashion until its contents are equal to 264 (decimal) after which it rests to zero upon the subsequent clock pulse received from the X-counter 53, and continues to increment in response to the reset of X-counter 53. This Y-counter is the counter shown in FIG. 7 and discussed previously with respect to FIG. 7.

Thus, it is evident that the X- and Y-counters 53 and 51 are indicative of predetermined areas on a CRT screen, wherein the X-counter is indicative of the vertical position, and the Y-counter is indicative of horizontal position. These outputs from the X-counter and Y-counter can therefore be utilized by the synchronizing signal generator 49 to provide synchronizing signals to a video logic circuit 57.

The video circuit 50 further includes a read-only memory (ROM) 59 and another read-only memory (ROM) 61. The read-only memory 59 is addressed by the contents of the position code shift register 45 and certain bits of the Y-counter 51. The output of the ROM 59 thus addressed is utilized as part of the address for accessing ROM 61 with the remaining portion of the address being formed by the output of the shift register 43 and certain bits of the Y-counter 51. The contents of the ROM 61 thus addressed are outputted in parallel to a shift register 63 which accepts data from the ROM 61 in parallel and provides such data serially to the video logic circuit 55. The shift pulses for the parallel-in serial-out register 63 are provided by the synchronizing signal generator 49.

The ROM 61 contains addressable information to provide as its output binary display information necessary for the display of the patterns illustrated in FIG. 5. Specifically, the information of each addressable location of the ROM 61 provides display information for one horizontal line segment of each pattern. As will be discussed more fully below, the ROM 59 designates for the ROM 61 (via a two bit portion of the address applied to the ROM 61) which subregion of the addressed pattern is to be displayed.

The particular functions of the video circuit 50 illustrated in FIG. 8 will now be discussed, and can best be understood by initial reference to the shift registers 43 and 45. The contents of the shift register 43 defines particular pattern codes which are desired to be displayed on a CRT. The position of each pattern code within the shift register implicitly defines the horizontal position on the CRT of the pattern desired to be displayed. The output of the pattern shift register 43 indicates which pattern appears at a predefined horizontal position on the CRT. The output of the pattern shift register therefore is indicative of what pattern data is required during each horizontal scan, and is therefore used to address the ROM 61. The output pattern code from the shift register 43 is determined by the appropriate coordination of the X-counter 53 (indicative of the horizontal scan position) and the microcomputer 30 which receives a blanking signal from the synchronizing signal generator 49. Thus, it is evident that the contents of shift register 43 is indicative of both pattern and horizontal position.

The shift register 45 stores position codes indicative of the vertical position of the pattern to be displayed (as defined by the contents of the shift register 43). As discussed previously, it is contemplated that separate pattern codes may be used to form particular notes. Thus, in order to display a note it may be necessary that two or more separate pattern codes be in the shift register 43, and that the corresponding position codes in the register 45 indicate the same vertical position for those two or more pattern codes. It should therefore be evident there is a one-to-one relationship between the pattern codes stored in the shift register 43 and the position codes stored in the register 45. The data in the shift registers 43 and 45 are shifted to provide outputs by the synchronizing signal generator 49 through the control logic 47. The shifting is a function of the incrementation of the X-counter 53. Thus, the outputs provided by the pattern and position shift registers 43 and 45 are in synchronization with the synchronizing signals provided by the synchronizing signal generator 49 to the video logic 57.

The specific addressing scheme utilized by the video circuit 50 for accessing particular display information in the read only memories 57 and 59 will presently be discussed. In order to more fully understand the following discussion, it should be kept in mind that the outputs from the shift registers 43 and 45 represent musical symbols or indicia which are to be displayed over a defined region on the CRT. However, as is well known, a CRT display region is generally divided into a raster matrix comprising binary dots. Therefore, it is necessary to provide information of the state of each of such binary dots (i.e., whether a particular dot is illuminated or not illuminated).

Specifically, for the display of each of the patterns set forth in FIG. 4, it is necessary to provide display information to the video logic 57. In this system, it is contemplated that binary bits are serially transmitted from the parallel-in serial-out shift register 63 to the video logic 57. Particularly, the output of the ROM 61 is 8 bits in parallel to the shift register 61. The 8 bits are display information for one horizontal scan or line of a pattern which, as discussed previously, is 8 display dots wide. Thus, the output of ROM 61 indicates which of those 8 dots is on (illuminated). It should therefore be apparent that the output of the ROM 61 must be a function of (1) pattern for display; (2) vertical and horizontal position; and (3) scan position.

The 5-bit output of the pattern shift register 43 is indicative of the pattern to be displayed. However, since only one line of a pattern is outputted to the register 63, more information is required to adequately access the ROM 61. Briefly, such information is provided by a 2-bit output from the ROM 59, and the lowest two bits of the Y-counter 51.

In the video circuit 50 of FIG. 8, the ROM 59 and the ROM 61 are accessed in a predetermined manner related to both the sweep of the CRT (as defined by the synchronizing signal generator 49) and the outputs of the pattern code shift register 43 and the vertical position code shift register 45. Such utilization of the read-only memories 59 and 61 is made possible by recognizing that the patterns defined by the information in the shift registers 43 and 45 occupy predetermined regions of a CRT. Therefore, the outputs of the shift registers 43 and 45 and the output of the Y-counter 51 can be utilized for ultimately addressing the ROM 61 for providing a specific display output which is adapted to the synchronization of the scan of the CRT. It should be noted that horizontal position information as set forth in the contents of the X-counter 53 is not directly utilized to access the contents of either of the read-only memories 59 or 61 since such horizontal information is implicit in the shifting of the shift registers 43 and 45 and also in the shifting of the serial output register 63.

In the addressing scheme described briefly above, it is contemplated that bit numbers 2 through 6 of the Y-counter 51 (corresponding to the higher order bits) are utilized in conjunction with the position code shift register 45 output to provide a 10-bit address for accessing the contents of the read-only memory 59. As described previously with respect to FIG. 7, the value of bit numbers 2 through 6 of the Y-counter effectively divides each possible pattern area into four vertically stacked subregions. FIG. 7 sets forth the values of bit numbers 2 through 6 of the Y-counter which are associated with particular areas on the CRT. That is, these are the values of bit numbers 2 through 6 when the corresponding vertically limited CRT areas (bounded by parallel horizontal lines) are being scanned. As also previously discussed, each of these values (for bit numbers 2 through 6) defines a region which comprises four horizontal scan lines of the CRT.

Therefore, the ROM 59 is accessed by a 10-bit address comprising the 5-bit position code from the position shift register 45 (indicative of the position of the pattern which is having one line defined by the current CRT scan), and the 5-bit output of bit numbers 2 through 6 (indicative of the area being scanned by the CRT). The ROM 59 is appropriately configured to provide outputs which indicate whether the present scan of the CRT is in an area where segment portion of a pattern is to be displayed. The output of the ROM 59 is a 4-bit output, wherein bit numbers 0 and 1 (the lower order bits) are used as part of the address accessing the ROM 61. These lower order bits indicate which portion of the pattern area is being scanned, and particularly which of the four subregions within the pattern area is being scanned. As discussed previously, the value of bit numbers 2 through 6 of the Y-counter 51 effectively divide a pattern area into four subregions, each comprising four horizontal scan segments.

Bit numbers 2 and 3 from the output of the ROM 59 are transmitted to the video logic 57. Bit number 2 provides a COINCIDENCE signal that indicates to the video logic the coincidence between position code and display area, i.e. a horizontal line of a pattern is to be displayed during the present scan. Bit number 3 provides a LINE signal that indicates to the video logic that the CRT scan is in an area where a horizontal staff line is to be displayed. The details of the video logic will be discussed further below.

FIG. 9 illustrates in matrix form the outputs provided by the read-only memory 59 as a function of the position code provided by the shift register 45 (FIG. 8) and the higher order bits of the Y-counter 51. The output of the read-only memory 59 is determined by the contents found at the intersection of the row defined by the position code and the column defined by the higher order bits of the Y-counter 51. The blank regions of FIG. 9 contain all zeros.

Returning to FIG. 8, the two lower order address bits for the ROM 61 are provided by the two lower bits of the Y-counter 51. These lower order bits of the Y-counter indicate to the ROM 61 which of the four line segments of the particular region within a pattern area is being scanned. As discussed previously, the two lower order bits from the ROM 59 are indicative of which of the four regions of a pattern area is being scanned. Therefore, the 9-bit address for the ROM 61 is indicative of pattern, pattern position, and present scan position. Thus, the ROM 61 is appropriately configured to be responsive to the address information to provide to the register 63 display information for a horizontal line segment of a pattern.

Effectively, the display data comprising 8 bits in the register 63 is the result of addressing the ROM's 59 and 61 with addresses that are indicative of the pattern to be displayed, the location of the pattern, and the present horizontal scan line. On the basis of such address information, the appropriate display information is accessed in the ROM 61 and transmitted to the shift register 63.

In the disclosed system, the synchronizing signal generator 49 provides a LINE POSITION signal to the video logic 57 when the lowest three bits of the Y-counter are all zero. The synchronizing signal generator 49 further provides a DISPLAY signal indicating that display is allowed. Specifically, the synchronizing signal generator 49 will provide a DISPLAY signal when the values of the X-counter 53 and the Y-counter 51 indicate that the CRT scan is in the predetermined effective display area (illustrated in FIG. 7) which is smaller than the display area of the CRT.

Figure 10:
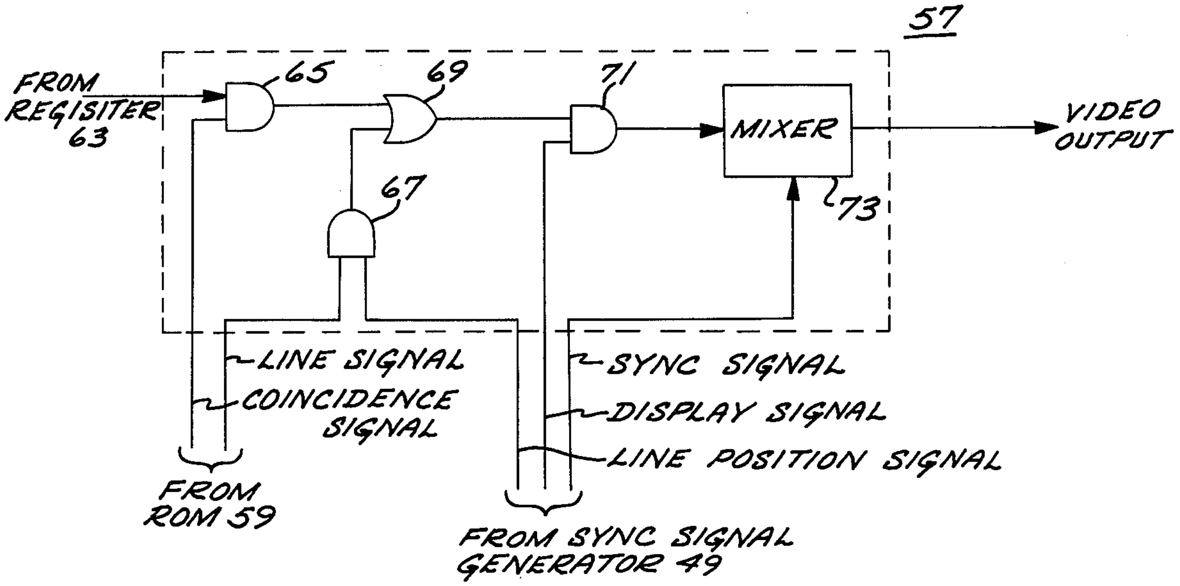
FIG. 10 is a circuit diagram of the video logic of the pattern display system.

FIG. 10 illustrates in detail form the circuitry of the video logic 57 (FIG. 8). The video logic circuit of FIG. 10 includes an AND-gate 65 which accepts as an input the output from the register 63. The AND-gate 65 further accepts the COINCIDENCE signal from the ROM 59. Therefore, the AND-gate 65 will provide a high output only when the ROM 59 indicates that a pattern display area is being scanned and when a high output is received from the shift register 63.

The circuit of FIG. 10 further includes an AND-gate 67 which accepts as one input the LINE signal from the ROM 59, and accepts as its other input the LINE POSITION signal from the synchronizing generator 49. Thus, the output of the AND-gate 67 will be high only when bit number 3 from the ROM 59 is a logical one (indicative that a music line is to be displayed), and when the three lower order bits of the Y-counter 51 (FIG. 8) are all zeros. It should be noted that since music lines can only be generated when the LINE POSITION signal is high, music lines can be defined only on every eighth horizontal scan line. In this particular example, such music line will be generated only along the top scan line of a given subregion within a pattern area. This is best understood by referring to FIG. 7 and the values of bit numbers 2 through 6 of the Y-counter 51 which are set forth in the left-hand column of FIG. 7. As indicated before each of these numbers represents a four-line area across the CRT screen, and each of those lines is further identified by the lower order two bits of the Y-counter. Therefore, since a value of 00 in the two order bits of the Y-counter represents the first line in the subregions represented by bit numbers 2 through 6 of the Y-counter, it follows that a LINE POSITION signal can only be generated when the scan is on the first line of any four-line subregion which fulfills the condition that the Y-counter has all zeros in its lowest three bits. Thus, music lines can be generated only along the first line of every other four-line subregion defined by the contents of Y-counter bit numbers 2 through 6.

The outputs of the AND-gates 65 and 67 are or'd through an OR-gate 69 which therefore provides an output when either of the outputs of AND-gates 65 or 67 is high. A third AND-gate 71 in the circuit of FIG. 10 accepts as one input the output of the OR-gate 69, and accepts as its other input the DISPLAY signal from the synchronizing signal generator 49. Since the DISPLAY signal is high only during those times when the CRT scan, as indicated by the contents of the Y-counter 51 and the X-counter 53, is in the predetermined effective display area (FIG. 7), the AND-gate 71 will allow the output of the OR-gate 69 to be transmitted as the output of AND-gate 71 only when the CRT scan is in the predetermined effective display area.

The output of the AND-gate 71 is provided as an input to a mixer 73 which also receives as another input the composite synchronizing signal from the synchronizing signal generator 49. Thus, the mixer 73 provides a video output which includes both display information and synchronization information to a CRT.

It should therefore be evident that with respect to the musical staff lines, both auxiliary lines and the normal five lines, they can be generated only at particular positions defined by the LINE POSITION signal, and under the control of the read-only memory 59. Specifically, the ROM 59 is configured to provide outputs wherein its most significant bit is a logical 1 for those position codes which indicate that a particular pattern is to be displayed where a music line is also to be displayed. For example, the horizontal areas defined by Y-counter bit numbers 2 through 6 having values of 0, 24, 26, 28 and 30 have the basic five music lines. Therefore, the contents of the ROM 59 which are accessed by a position code indicative of a pattern to be displayed in those areas and a value of bit numbers 2 through 6 of the Y-counter which also indicates that the CRT scan is in those music line areas, are configured to provide a logical 1 output in bit number 3. Of course, although the outputs of the ROM 59 which indicate that music lines are to be displayed in particular areas refer to areas that are comprised of four lines, the LINE POSITION signal from the synchronizing signal generator 49 will allow a music line to be displayed only in the first horizontal line segment of the subregions of each pattern area, which subregions are defined by the output of the read-only memory 59.

As discussed previously with respect to FIG. 7, certain position codes result in the display of only half of a designated pattern. Specifically, the designation of position codes 8 and 24 (decimal) will result in the display of only the upper half of the corresponding pattern. Also, designation of position codes 16 and 25 will result in the display of only the lower half of the corresponding pattern. For example, Table IV illustrates the output of the ROM 59 is response to position code 8 as a function of the value in bit numbers 2 through 6 of the Y-counter 51.

TABLE IV

| | Position Code 8 |
|---|---|
| ROM 59 | Y-Counter Bit Nos. 2-6 |
| 1000 | 0 |
| 0100 | 20 |
| 0101 | 21 |
| 1000 | 24 |
| 1000 | 26 |
| 1000 | 28 |
| 1000 | 30 |

The first and last four values of the ROM 59 outputs (Table IV) allow only the display of the five basic music lines. It should be noted that the values of bit number 2 for the second and third values of ROM 59 are both 1, thereby indicating that portions of the associated pattern may be displayed in those areas represented by the values of 20 and 21 for the Y-counter bit numbers 2 through 6. Therefore, display will be possible only in the top half of the pattern area defined by position code 8 since a COINCIDENCE signal will be present from the ROM 59 to the video logic 57 only when the value of Y-counter bits 2 through 6 indicates that the scan is in the top half of the pattern area defined by position code 8, as shown in FIG. 7. It should also be pointed out that the values of ROM 59 outputs for position code 8 with the values of 22 and 23 for Y-counter bits 2 through 6 are all zeros, as can be seen by reference to FIG. 9. The values of 22 and 23 for Y-counter bit numbers 2 through 6 correspond to the lower half of a pattern area that is defined by position code 8. However, since the contents of the ROM 59 for the bottom half of such pattern area are zeros, no display will be effected. Similarly, display is possible only in the top half of the pattern area defined as position code 24, which has its corresponding ROM 59 output values configured to allow display only in the top half of the pattern area defined by position code 24. In analogous fashion, the contents of ROM 59 which are addressed by position codes 16 and 25 are configured to allow the display of a pattern only in the lower halves of the pattern areas defined by position codes 16 and 25. Specifically, the contents of ROM 59 which are accessed by position codes 16 and 25 are all zeros except for those values of Y-counter bit numbers 2 through 6 which correspond to the respective lower halves of the pattern areas defined by position codes 24 and 25. It should be noted that the contents in the ROM 59 which are addressed by position codes 24 and 25 do not include information for displaying the five basic music lines, whereas the contents of the ROM 59 which are addressed by position codes 8 and 16 include information for display of the five basic music lines.

Therefore, by using these position codes, namely position codes 8, 16, 24 and 25, with the pattern codes 11000 through 11111 in FIG. 5, alpha-numeric patterns may be displayed to the extend that such patterns are available in the pattern codes. As noted previously, the patterns defined by pattern codes 11000 through 11111 in FIG. 5 are actually two patterns defined by each respective pattern code. Thus, by appropriately utilizing position codes 8, 16, 24 and 25, the appropriate half pattern can be displayed.

Pattern codes 01010 through 01110 (FIG. 5) designate particular patterns which are symbols used to indicate pauses. These particular codes are generally for use with the position code 6, since the pause symbols are generally located in a particular area on the music staff.

It should be noted that position codes 11010 (decimal 26) and 11111 (decimal 31) have corresponding contents in the ROM 59 which do not include information for generating the five basic music lines. This can be seen by reference FIG. 9 and noting that the ROM contents addressed by these position codes all contain zeros in the bit number 3 position. Therefore, the question mark pattern (pattern code 10101) may be used in conjunction with these position codes to indicate the occurrences of an erroneous operation phase. Similarly, the pattern area designated by position code 11110 (decimal 30) may also be used to display a question mark when improper data is decoded while device is in a play mode.

The uniqueness and flexibility of the display information generating capabilities of the video circuit 50 are well illustrated by reference to the specialized use of position code 11101 (decimal 29). Table V below sets forth the output value of the ROM 59 as a function of the value in bit numbers 2 through 6 of the Y-counter when position code 11101 is used as part of the address for the ROM 59. Of course, it should be remembered that the output value of the ROM 59 are all zeros when it is addressed with the position code 11101 and Y-counter bit numbers 2 through 6 values other than the values set forth in Table V.

TABLE V

| ROM 59 | Y-Counter Bit Nos. 2-6 |
|---|---|
| 1000 | 0 |
| 1100 | 24 |
| 0101 | 25 |
| 1110 | 26 |
| 0111 | 27 |
| 1110 | 28 |
| 0111 | 29 |
| i100 | 30 |
| 0101 | 31 |

The output of the ROM 59 includes a logical 1 in the bit number 3 position when the value of Y-counter bit numbers 2 through 6 is zero, 24, 26, 28, and 30. These correspond to the five basic music lines to be displayed and are transmitted to the video logic as LINE signals. The output of the ROM 59 includes a logical 1 in the bit number 2 position (used as a display COINCIDENCE signal) foı the values of Y-counter bit numbers 2 through 6 of 24 through 31, thereby indicating display in the subregions defined by those values of the Y-counter.

Specifically, the display area is shown by the shaded area in FIG. 7 which corresponds to position code 29. What is particularly interesting about the ROM 59 contents addressed by position code 11101 are the contents of bit numbers 0 and 1 of the ROM output. Bit numbers 0 and 1 of the ROM 59 output change as follows as the value of Y-counter bits 2 through 6 change from 24 through 31: 00, 01, 10, 11, 10, 11, 00 and 01. These sequence of changes in the output of the ROM 59 indicate that portions of the corresponding pattern (defined by the corresponding pattern code) are utilized in a sequence which is different from the sequence which would ordinarily result in the pattern defined by the pattern code. This can best be understood by recalling that each pattern is divided into four vertically stacked subregions by bit numbers 2 through 6 of the Y-counter 51 and by the corresponding 2-bit output of the ROM 59 which is used to address the ROM 61. As also indicated previously, ROM 59 effectively indicates to the ROM 61 which four line subregion of the pattern is presently being scanned. Since the ROM 61 contains pattern information for various portions of each pattern, it can be appropriately accessed to provide at its output pattern information which is indicative of any of the portions of various patterns. In the particular example with position code 11101, the various portions are accessed by the predefined sequence of changes in bit numbers 0 and 1 of the ROM 59 output.

Figure 11:
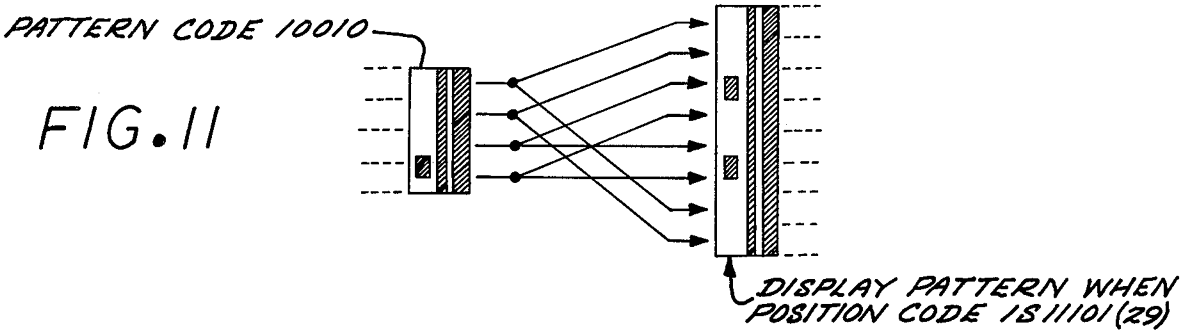
FIG. 11 illustrates a particular utilization of certain contents of a read-only memory of the pattern display system.

FIG. 11 illustrates specifically the display result of utilizing various subregions of a particular pattern defined by pattern code 10010 in conjunction with the position code 11101. Therefore, it should be apparent that the contents of the ROM 59 controls the sequence of display of subregions of a pattern defined by a pattern code. That is, subregion portions of a pattern may be transported by appropriate configuration of the contents of the ROM 59.

Figure 12:
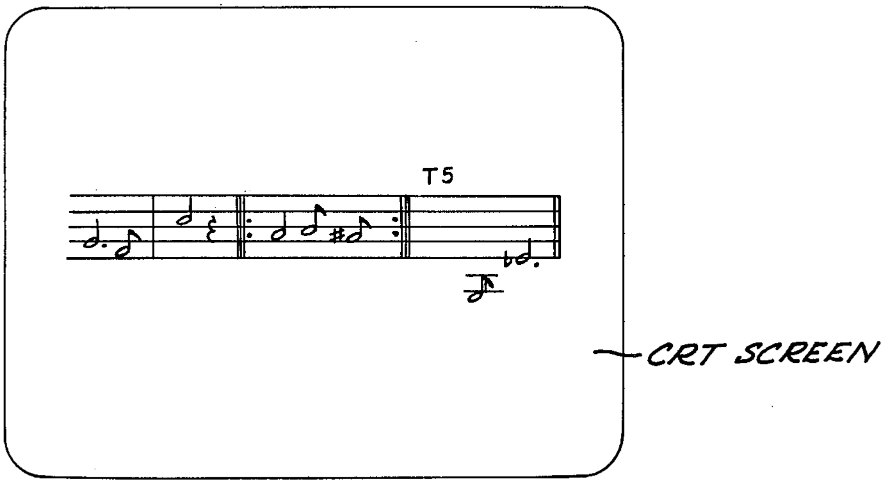
FIG. 12 illustrates a display resulting from the use of the disclosed pattern display system.

Similarly, transposition of subregions of the patterns defined by pattern codes 10001, 10011, and 10100 results in the end of music lines, the repetition symbol, and the phrase boundary line, respectively. FIG. 12 illustrates the display result when pattern codes 10001 through 10100 are used in conjunction with position code 11101. In this particular example, the transposition is accomplished by the ROM 59 contents addressed by position code 11101.

Position codes 11011 (decimal 27) and 11100 (decimal 28) are utilized only for testing purposes. As can be seen by reference to FIG. 9, designation of these position codes will result in display along a complete vertical column at the horizontal position attributed to the position codes by virtue of their positions within the position code shift register 45 (FIG. 8). The lowest 2 bits of the ROM 59 contents addressed by position code 11011 are out of phase with respect to the ROM 59 contents addressed by position code 11100 for the same values of the Y-counter bit numbers 2 through 6. Therefore, if the pattern 10110 (FIG. 5) is displayed with position codes 11011 and 11100 alternately, a checkerboard-like pattern will be displayed on the CRT screen. This test pattern is particularly useful for performing circuit testing.

In summary, it should be apparent that the utilization in the disclosed pattern display system of two read-only memories allows for the display of complex patterns such as musical indicia, as well as allowing for flexibility in the display of patterns and also in the choice of patterns. Since the contents of read-only memories are readily changed, the disclosed system can be adapted for the display of other types of complex patterns.

The unique and flexible aspects of the disclosed system are achieved by utilizing a first read-only memory for controlling the access of pattern display information from a second read-only memory. Each of these read-only memories is specifically adapted to be responsive to particular predefined codes which can be readily configured for use in various applications.

Although the foregoing is a disclosure of a particular embodiment of the disclosed invention, it will be apparent to those skilled in the art that various modifications and changes can be made without departing from the scope and spirit of the invention which is defined by the following claims.

What is claimed is:

1. A pattern display system for use with a cathode ray tube, comprising:

a keyboard having selectively actuable key switches, each of said switches representing a predetermined symbol or function;

processing means responsive to said keyboard switches for storing information representative of symbols corresponding to the symbols represented by actuated symbol key switches, and for performing predetermined functions corresponding to functions represented by actuated function key switches, said processing means further providing as an output pattern display information representative of the individual patterns necessary for the display of said symbols; and video circuitry responsive to said processing means for generating video signals indicative of the patterns represented by said pattern display information, said video circuitry including first and second read-only memories which are accessed as a function of said pattern display information and the vertical scan of the cathode ray tube, said second read-only memory containing display information for each horizontal line segment of all patterns utilized by the pattern display system and said first read-only memory controlling said second read-only memory.

2. The pattern display system of claim 1 wherein said video circuitry includes a first recirculating shift register for storing display pattern codes and a second recirculating shift register for storing display vertical position codes associated with said pattern codes, each pattern code having a corresponding vertical position code, and said shift registers providing respective individual pattern codes and position codes as outputs.

3. The pattern display system of claim 2 wherein said first read-only memory is addressed as a function of the output of said position code shift register and the vertical scan of the cathode ray tube, and wherein said second read-only memory is addressed as a function of the output of said pattern code shift register, the output of said first read-only memory, and the vertical scan of the cathode ray tube.

4. The pattern display system of claim 3 wherein said shift registers are simultaneously shifted as a function of the horizontal scan of the cathode ray tube.

5. The pattern display system of claim 4 further including an X-counter for controlling the horizontal scan of the cathode ray tube, and a Y-counter for controlling the vertical scan of the cathode ray tube.

6. The pattern display system of claim 5 wherein said first read-only memory is partially addressed by preselected bits of said Y-counter, and wherein said second read-only memory is partially addressed by different preselected bits of said Y-counter.

7. The pattern display system of claim 6 wherein said shift registers are shifted as a function of said X-counter.

8. The pattern display system of claim 2 wherein the correspondence between the pattern codes and the position codes in said respective recirculating shift registers is determined by position within said respective recirculating shift registers.

9. The pattern display system of claim 8 wherein respective display horizontal positions of patterns represented by said pattern codes is determined by the respective positions of said pattern codes within the first recirculating shift register.

10. A display system for use with a cathode ray tube for displaying a plurality of individual display patterns wherein each display pattern is defined by selectively illuminated binary display dots which are vertically arranged in horizontal line segments, the combination comprising:

means for storing pattern codes representative of each display pattern to be displayed and for providing as its output individual pattern codes indicative of the display patterns to be displayed, said pattern code storing means being accessed as a function of the cathode ray tube horizontal scan to provide said output pattern codes at the proper time for display, and each of said pattern codes having a reference pattern comprised of a matrix of binary display dots which is subdivided into subregions, each subregion having adjacent horizontal line segments of binary dots;

means for storing a vertical position code for each of said pattern codes and for providing as its output the position code associated with the pattern code output of said pattern code storing means, each of said position codes being indicative of the vertical display position of the display pattern represented by the associated pattern code, said vertical position code storing means being accessed as a function of the cathode ray tube horizontal scan to provide the proper position code output for the pattern code output of said pattern code storing means;

first memory means addressed as a function of said position code output and the cathode ray tube vertical scan position for providing as its outputs information indicative of whether a component of a display pattern is to be displayed at the present scan of the CRT and which subregion of the reference pattern corresponding to the output pattern code is presently to be displayed; and second memory means addressed as a function of said pattern code output, said first memory means output, and the vertical scan position of the cathode ray tube, said second memory means providing an output representative of the present line segment of a display pattern to be displayed.

11. The display system of claim 10 further including an X-counter for controlling the horizontal scan of the cathode ray tube, and a Y-counter for controlling the vertical scan of the cathode ray tube.

12. The display system of claim 11 wherein said pattern code storing means comprises a recirculating shift register, and wherein said position code storing means comprises a recirculating shift register, said shift registers being shifted as a function of said X-counter.

13. The display system of claim 12 wherein said first memory means is addressed in part by a first portion of the contents of said Y-counter, and wherein said second memory means is addressed in part by a second portion of the contents of said Y-counter.

14. The display system of claim 13 wherein said first and second memory means each comprises a read-only memory.

15. The display system of claim 14 wherein said first read-only memory defines the sequence in which the subregions of the reference pattern corresponding to the pattern code output are to be displayed, thereby providing for the display of display patterns different from the reference patterns associated with said pattern codes.

* * * * *